Inventor
Herbert Ludwig

Feb. 4, 1969  H. LUDWIG  3,425,094
APPARATUS FOR MAKING FOOTWEAR WITH BOTTOMS
APPLIED BY INJECTION MOLDING
Filed April 22, 1966  Sheet 3 of 3

United States Patent Office 3,425,094
Patented Feb. 4, 1969

3,425,094
APPARATUS FOR MAKING FOOTWEAR WITH BOTTOMS APPLIED BY INJECTION MOLDING
Herbert Ludwig, Desmastr, 112, Usen,
near Bremen, Germany
Filed Apr. 22, 1966, Ser. No. 544,568
U.S. Cl. 18—30                6 Claims
Int. Cl. B29f 1/22; A43d 35/00; B29h 5/00

ABSTRACT OF THE DISCLOSURE

A mold assembly comprising a side ring and sole plate movable relative to each other, a ram supporting the sole plate for movement, tandemly arranged cylinders containing pistons, means for supplying pressure to the pistons to raise and lower the sole plate and to control lowering movement of the sole plate to enable obtaining a bottom of predetermined thickness and porosity, and a switch operable by displacement of the sole plate through a predetermined distance to terminate injection of the bottom-forming composition into the mold cavity.

---

Figure 1:
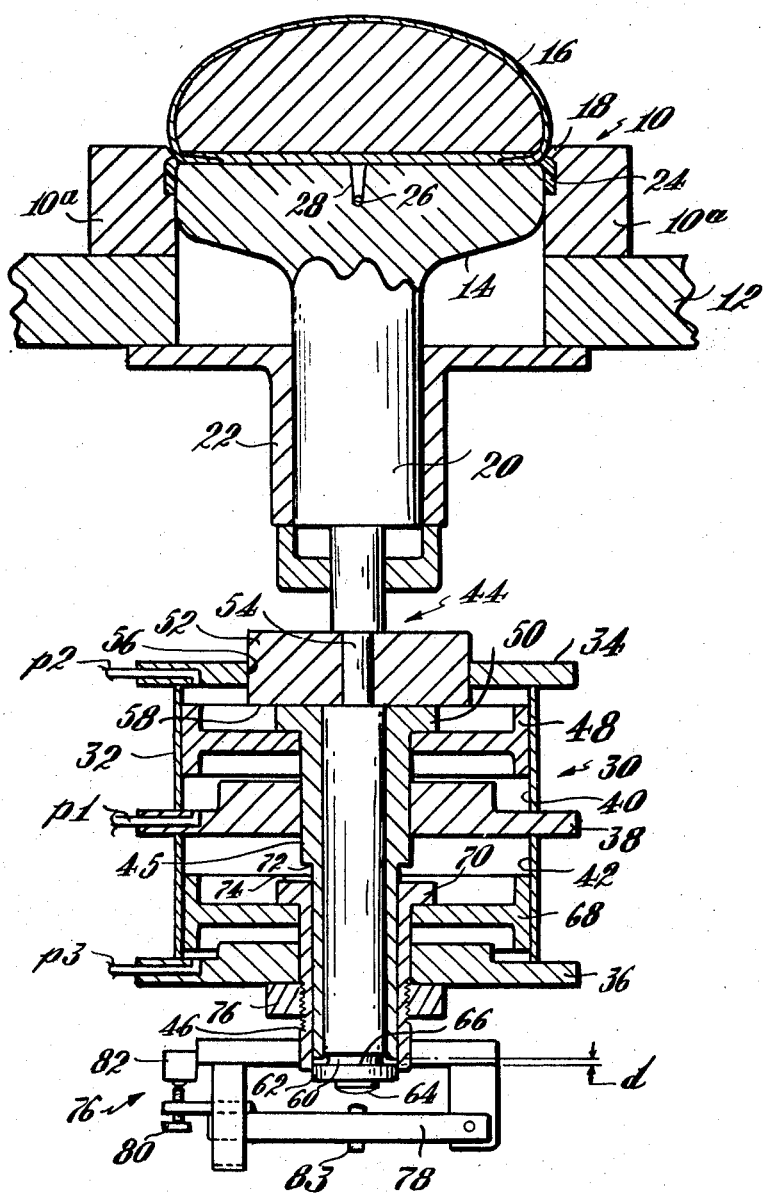

The objects of the invention are to provide a bottom embodying a yieldable internal layer, that is containing a multiplicity of pores which make it soft and affords foot comfort, and a dense wear-resistant surface layer which affords resistance to damage and appearance; to provide a bottom of the foregoing kind which embodies different degrees of yieldability; optionally to provide a bottom of the foregoing kind with a dense edge strip peripherally of the edge of the bottom; to provide an improved apparatus for obtaining one or more of the foregoing characteristics.

The invention comprises a mold assembly comprising a side ring and a sole plate movable relative thereto, and comprises raising the sole plate to a position relative to the bottom of a shoe resting on the top of the side ring to form a cavity for receiving a volume of unexpanded elastomer which, when expanded, will produce a bottom of the desired thickness, employing the pressure produced by filling the mold cavity with the unexpanded elastomer to displace the sole plate slightly, employing the displacement of the sole plate to shut off the injector, and then allowing unexpanded elastomer to expand to the predetermined desired thickness. The method includes allowing the elastomer to expand in opposition to the frictional resistance of the sole plate to displacement or by moving the sole plate away from the bottom to a position corresponding to the ultimate thickness of the bottom to be formed and allowing the elastomer to expand unopposed into this cavity. In either way of permitting expansion of the elastomer, a holding period of 1 to 30 seconds may be employed prior to allowing the sole plate to become displaced. Optionally, the side ring may be provided with a groove corresponding in depth and thickness to an edge strip to be formed about the bottom and the sole plate raised into engagement with the bottom for forming an edge strip prior to injection of the bottom-forming material. The method may include artificial cooling of the last, side ring and sole plate or parts thereof.

The means for effecting movement of the sole plate relative to the side ring comprises a ram connected at one end to the sole plate, and a piston on the ram operable to move the ram and hence the sole plate away from the bottom to provide a cavity of predetermined depth to receive the unexpanded elastomer. The sole plate and ram at this position of the piston are movable relative to the piston a predetermined further distance away from the bottom by the pressure of the unexpanded elastomer within the mold cavity and a switch is arranged adjacent the ram operable, by this further movement of the ram, to terminate injection. The added movement is provided by spaced shoulders on the ram between which the piston is movable and operable, by engagement with one shoulder, to move the ram toward the mold assembly and with the other shoulder away from the mold assembly, the shoulders being spaced to afford a slight lost motion between the piston and the ram. Specifically, a sleeve supports the piston on the ram, the axial length of which is slightly shorter than the distance between the shoulders on the ram so that the sleeve has a lost motion of an amount corresponding to the difference between its length and the spacing of the shoulders. The ram passes all the way through a cylinder embodying tandemly arranged chambers within one of which the piston is situated, and there is means for supplying pressure fluid to the chamber within which the piston is located to effect its movement. The sleeve extends from the one chamber into the other and through a second sleeve located in the second chamber, both sleeves extending through the end of the cylinder in concentric relation to each other and the ram. A second piston is secured to the second sleeve and there are shoulders on the first and second sleeves within the second chamber engageable, by relative movement of the pistons, to effect movement of the sole plate away from the mold assembly and to limit such movement. One of the shoulders on the ram is constituted by a piston fixed thereto which occupies an opening in the end wall of the chamber containing the first piston and the other by an abutment plate secured to the distal end of the ram externally of the end wall of the other chamber. The abutment plate is circular and corresponds in diameter to the adjacent end of the one sleeve. An adjustable member is threaded on the other sleeve externally of the end wall of this latter chamber and is operable, by engagement therewith, to limit movement of the ram toward the mold assembly. Movement of the ram away from the mold assembly is limited by bottoming of the second piston on the end wall of its chamber.

Figure 2:
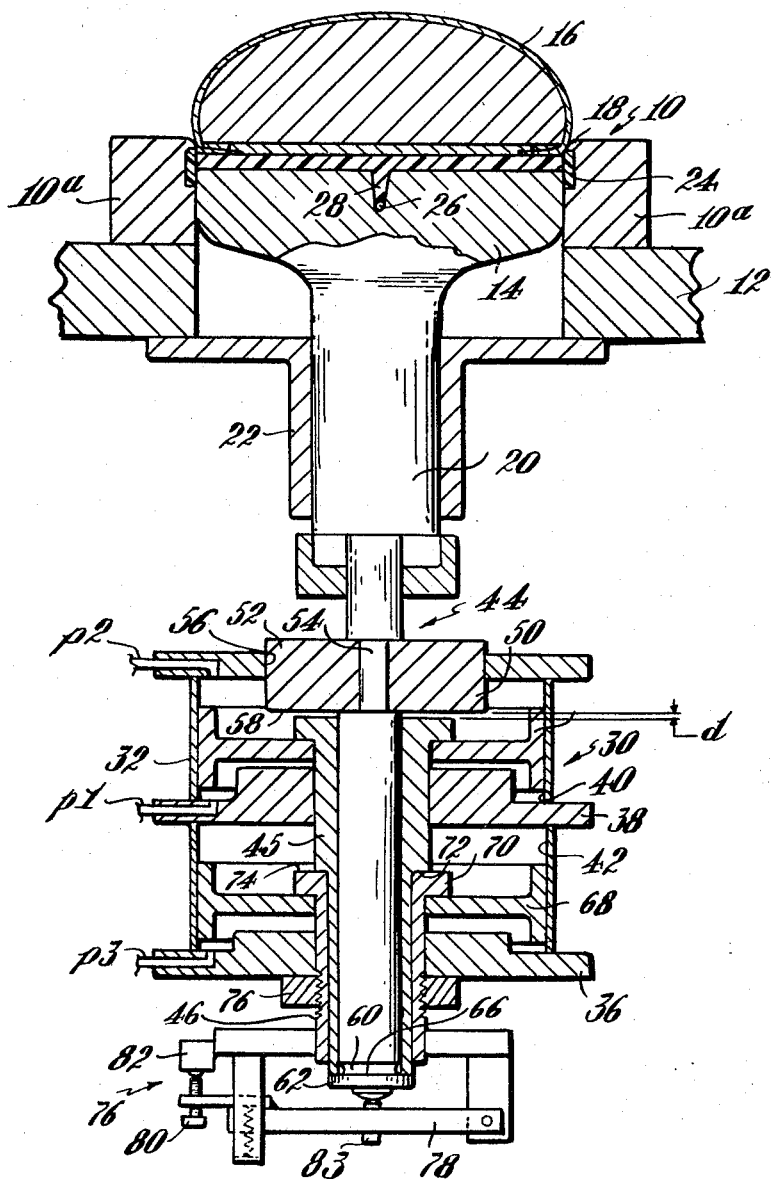
Figure 3:
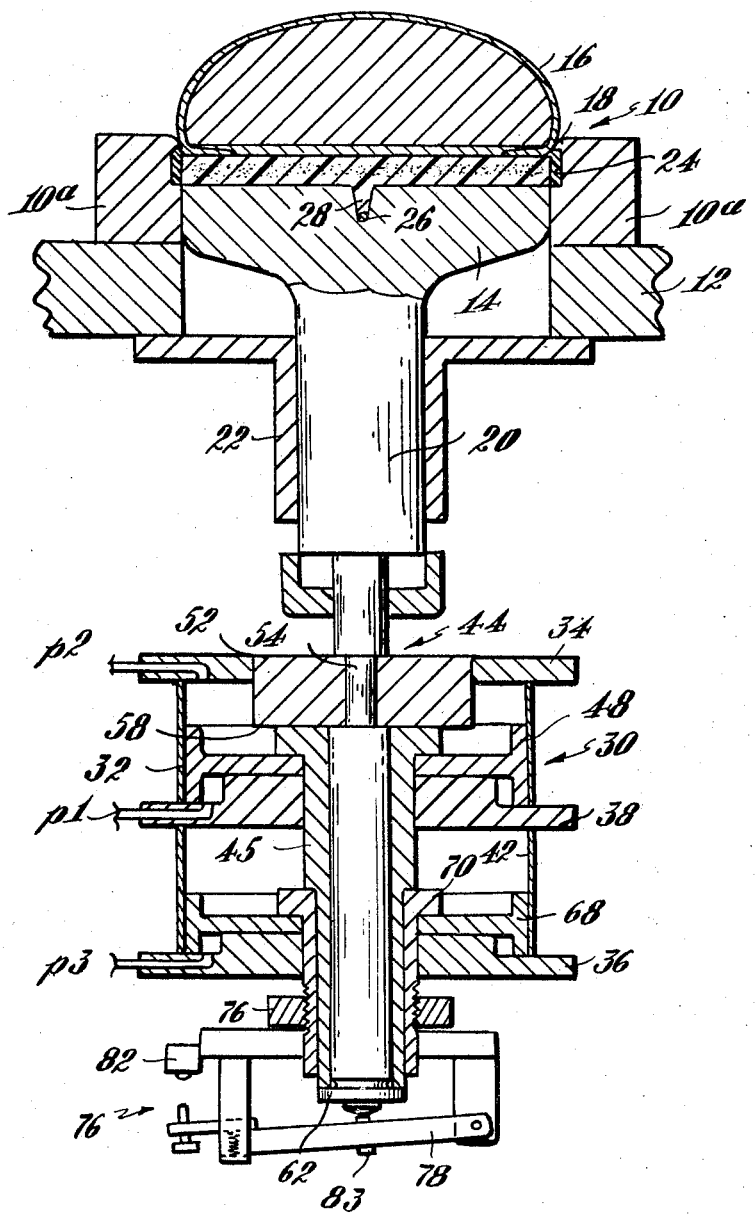

The invention will now be described in greater detail with reference to the accompanying drawings wherein:

FIG. 1 is an elevation, partly in section, taken transversely of a mold assembly and fluid operable means designed automatically to effect movement of the sole plane relative to the side ring, with the parts so located that the sole plate is at an elevated position in contact with the bottom of the lasted upper;

FIG. 2 is an elevation similar to FIG. 1 with the sole plate lowered to provide a cavity below the bottom of the lasted shoe for receiving an injection of unexpanded elastomer in such quantity as to provide, when expanded, a bottom of the desired thickness; and FIG. 3 is an elevation similar to FIGS. 1 and 2, showing the position of the sole plate after expansion of the elastomer to the thickness desired for the bottom.

Referring to the drawings (FIG. 1), the mold assembly is of conventional construction comprising a side ring 10 made up of parts 10a—10a which are separable along a median lengthwise of the lasted upper 16, and a sole plate 14 movable within the side ring toward and away from the bottom of the lasted upper. The bottom of the lasted upper rests on the open top of the side ring, preferably in engagement with a lip 18 surrounding the opening, and the parts 10a—10a rest on a rigid support 12 comprising part of a supporting frame for one or more of such assemblies. The sole plate is secured to or formed integral with the upper end of a ram 20 guided in a bearing 22 secured to the underside of the supporting frame 12.

The side ring 10, as illustrated, contains a groove 24 in its inner surface subjacent the lip 18 for the purpose of providing an edge strip peripherally of the bottom which is to be formed; however, this may be omited if desired.

The elastomer is supplied to the mold cavity through conventional passages in the side ring, usually at the confronting faces of the side ring halves, and through a passage 26 in the sole plate, the latter in turn being connected to the interior of the mold cavity by short orifice passages 28 extending therefrom through the upper surface of the sole plate.

The sole plate 14 is moved in elevation relative to the bottom of the lasted upper by fluid pressure operable means 30 which is designed especially to enable automatically filling the mold cavity and controlling expansion of the elastomer to form bottoms having a porous cushion-like interior and a dense nonporous and wear-resistant skin-like exterior. The fluid pressure operable means 30 comprises a cylinder 32 having end walls 34 and 36 and is divided between its ends by an intermediate wall 38 into tandemly arranged chambers 40 and 42. The ram 20 has fomed integral with it or attached to it a rod 44 which extends all the way through the cylinder 32, that is through the end wall 34, intermediate wall 38 and end wall 36. There are two concentrically arranged sleeves 45 and 46 situated within the cylinder, the sleeve 45 containing a portion of the rod 44 and extending from the chamber 40 through the intermediate wall 38 into and through the chamber 42 and through the end wall 36. The sleeve 46 in turn contains the sleeve 45 and extends from the chamber 42 through the end wall 36. The portion of the rod 44 within the sleeve 45, the sleeve 45 and the sleeve 46 are all movable relative to each other axially within the cylinder.

A motion-transmitting piston 48 is mounted on the sleeve 45 within the chamber 40 and is secured to a flange 50 at the upper end of the sleeve 45 so that the piston is operable to effect movement of the sleeve 45 relative to the portion of the rod which passes through it. Pressure is supplied to the opposite ends of the chamber 40 through conductors P1 and P2 to move the piston 48 either upwardly relative to the mold assembly by supplying pressure to the conductor P1 or downwardly away from the mold assembly by supplying pressure to the conductor P2 and venting pressure from the conductor P1. The motion of the piston 48 upwardly to move the sole plate toward the mold assembly is transmitted to the rod 44 by engagement of the flange 50 at the upper end of the sleeve with a piston member 52, mounted on the rod 44 on a reduced portion 54 of the rod so that its position is fixed on the rod. The piston member is movable within an opening 56 in the end wall 34 with the rod as the latter moves axially within the cylinder and its lower surface in effect constitutes a fixed shoulder 58 on the rod with which the upper end of the sleeve is engageable to move the rod and hence the sole plate upwardly relative to the mold assembly.

The opposite or lower end of the rod 45 projects as heretofore related beyond the lower end wall 36, is reduced slightly in diameter at 60 and a circular plate 62 is fastened thereto, for example, by a screw bolt 64. The plate 62 corresponds in diameter to the lower projecting end of the sleeve, but is smaller than the sleeve 46, and provides a second fixed shoulder 66 on the rod 44. The distance between the shoulders 58 and 66 is slightly greater than the axial length of the sleeve 45 so that there is a lost motion or play between the rod and the sleeve and consequently the piston 48 is movable relative to the rod in either direction an amount $d$ corresponding to the difference between the shoulders and the lengh of the sleeve.

As a consequence of this lost motion, it is at once apparent that if pressure is supplied to the piston 48 to raise the sole plate, the sleeve will first move upwardly relative to the rod the distance $d$ before its upper flanged end engages the shoulder 58, whereupon further upward movement of the sleeve will raise the rod and hence the sole plate. When pressure is supplied to the upper side of the piston 48 to lower the sole plate, motion will not be transmitted to the rod until the lost motion has been taken up by downward movement of the piston and sleeve relative to the rod through the distance $d$ between the lower end of the sleeve 45 and the shoulder 62. This lost motion will be used for a purpose which will appear hereinafter in conjunction with the making of the shoe according to this invention.

A second piston 68 is mounted on the sleeve 46 within the chamber 42 and is fastened to a flange 70 at the upper end of the sleeve. The piston 68 is provided for the purpose of controlling the downward movement of the rod in opposition to the downward movement imparted thereto by the piston 48 and hence to retard downward movement of the sole plate in the side ring. For this purpose a portion of the sleeve 45, situated in the chamber 42, is provided with a shoulder 72 which, by engagement with a shoulder 74 constituted by the upper surface of the flange 70 at the upper end of the sleeve 46, limits movement of the sleeve 45 relative thereto, and a conductor pipe P3 is provided to supply pressure fluid to the underside of the piston 68. The bottoming of the piston 68 on the end wall 36 will, of course, limit the extent of movement of the rod downwardly. In order to limit the upward movement an adjustable collar 76 is threaded onto the outside of the sleeve 45 outwardly of the end wall 36.

In accordance with this invention, a switch 82 is employed to shut off the injector and thereby to terminate injection when the mold cavity is properly filled and this is automatically actuated by switch-actuating means 76 mounted at the lower end of the rod 44 in a position such that downward movement of the rod 44 relative to the sleeve 45 through the distance $d$ will depress a lever 78 in opposition to a spring which normally holds the lever and an adjustable screw 80 at its distal end in engagement with the switch 82. As illustrated, the lever 78 supports an adjustable pin 83 threaded through it vertically below the head of the screw 64, so that the latter by contact with the screw will force the lever 78 downwardly and hence the adjustable screw 80 away from the switch 82.

The apparatus may be used to produce a bottom member having a porous interior and an impervious dense and wear-resistant skin and optionally a peripheral edge strip which is also dense and wear-resistant.

If the edge strip is to be provided the sole plate 14 is raised upwardly within the side ring 10 until its upper surface contacts the lower surface of the lasted upper and insole, if the latter is provided with an insole, by supplying pressure fluid through the conductor P1 to the lower end of the chamber 40 so that it forces the piston 48 upwardly within the chamber which, in turn, through the upper end of the sleeve 45 operates on the shoulder 58 to force the rod 44 upwardly. The upper limit of the movement is of course controlled by contact of the adjustable collar 76 with the lower side of the end wall 36 so that the fluid pressure within the chamber 40 will not unseat the lasted upper from the lip 18 at the top of the side ring. Due to the resistance of the sole plate to movement the upward movement of the piston will first move the sleeve 45 through the distance $d$. Simultaneously, the sleeve 46 will carry the piston 68 upwardly within the chamber by its frictional engagement with the sleeve 45.

Elastomer is now injected through the side ring 10 to fill the cavity 24 thereby to form the edge strip. During this injection the injection orifice or orifices in the sole plate may be covered with a suitable material to prevent access of the elastomer thereto. A plastic or felt disc or its equivalent may be placed over these openings and should be comprised of a material which will become embedded in the bottom during the injection of the elastomer for forming the bottom. Following injection of the edge strip, pressure is supplied to the upper side of the piston 48 through the conductor P2 and vented from the conductor P1 at the lower side to move the sole plate down to the position shown in FIG. 2, thereby to provide a cavity beneath the lasted upper which is of such a size as to receive a quantity of unexpanded elastomer which can be expanded to the desired thickness of the bottom to be formed. As seen in FIG. 2 this position of the sole plate is intermediate the upper and lower ends of the groove 24. Since as pointed out above the length of the sleeve 44 is less than the distance between the shoulders 58 and 66 by the distance $d$, the initial downward movement of the piston 48 first slides the sleeve downwardly on the rod a distance $d$ so that the shoulder 72 engages the shoulder 74 and the lower end of the sleeve contacts the plate 62 and then moves the rod and hence the sole plate downwardly to the position illustrated in FIG. 2, in which position the screw bolt 64 just engages the upper end of the pin 82. The lost motion $d$ between the rod and the sleeve is now at the upper end of the sleeve 45 as represented by the gap $d$ between the upper end of the sleeve 45 and the lower side 58 of the piston member 52. With the sole plate in this lowered position unexpanded elastomer is injected into the mold cavity from the injection apparatus. When the mold cavity becomes filled, pressure in excess of the filling pressure produced by the injection will displace the sole plate downwardly the distance $d$ and by such displacement displace the lever 78 downwardly so as to disengage the screw 80 from the switch 82 and cut off injection.

At this stage it is desirable to maintain the sole plate in position for a period of 1 to 30 seconds depending upon the kind of elastomer employed for making the bottom and the specific characteristics to be obtained. Primarily the delay at this stage provides for forming a dense non-porous skin at the surfaces in contact, respectively, with the bottom of the lasted upper, the upper surface of the sole plate and the inner surface of the side ring or with the inner side of the edge strip which had been previously formed. The thickness of the skin will depend to some extent upon the length of the delay and may be expedited by artificially cooling the side ring, last and sole plate if desired. Such cooling may be achieved by providing passages in the respective parts through which may be circulated a cooling fluid and it has been found that by varying the degree of cooling the thickness of the skin may be increased or decreased in various areas and that the size of the pores may also be controlled.

After a sufficient time delay, the pressure at the underside of the piston 48 may be vented completely to free the piston 48, and the expansion of the elastomer due to the foaming agent contained therein may be permitted to force the sole plate downwardly in the side ring, constrained only by the frictional resistance of the pistons and the sleeves to downward movement within the cylinder. Downward movement of the sole plate is limited, of course, by bottoming of the piston 68 on the lower end wall 36 of the cylinder, so that the upper surface of the sole plate is substantially at the level of the lower edge of the recess 24 in the side ring, or, if there is no such recess, to the predetermined level desired for the final thickness of the bottom.

The downward movement of the sole plate in response to the expansion of the elastomer following formation of the skin is relatively slow and results in the formation of an interior core within the skin filled with relatively small pores. Since the interior of the body of elastomer remains liquid longest, that is cooling takes place from the outer surface inwardly, the pores adjacent the surface are smallest and progressively increase in size toward the center, that is midway between the top and bottom surfaces.

Instead of allowing the sole plate to be forced downwardly by the expansion of the elastomer, the sole plate may be moved all the way down to the desired level for obtaining a sole of a predetermined thickness by supplying pressure to the upper side of the piston 48 and venting it from the lower side. The elastomer is thus allowed to expand freely, that is substantially unconstrained within the mold cavity to the full thickness desired. This freedom of expansion, of course, results in pores of relatively larger size.

Preferably the displacement of the sole plate is controlled by supplying fluid pressure to the lower side of the piston 68 so as to retard movement of the sole plate downwardly in opposition to the pressure applied to the piston 48. Such retardation of the sole plate can be controlled to provide, for example, very small pores during the initial expansion or lowering of the sole plate, that is small pores adjacent the skin and pores of larger size interiorly thereof or vice versa as desired.

As pointed out above, the thickness of the skin and the size of the pores is also influenced by cooling and hence it is contemplated that the mold assembly may be cored to provide passages for circulation of cooling fluid through the last, side ring and sole plate.

The elastomer employed is polyvinyl chloride with which is mixed a suitable foaming or expanding agent of the kind which provides for a delay prior to activation of sufficient duration to permit formation of a skin at the surfaces.

It should be understood that the present disclosure is for the purpose of illustration only and that this invention includes all modifications and equivalents which fall within the scope of the appended claims.

I claim:

1. In an apparatus for making footwear by injection molding including a mold assembly embodying a side ring and sole plate movable relative to the side ring, means for effecting movement of the sole plate pursuant to forming a bottom comprising tandem, concentrically arranged first and second cylinders having a common intermediate head between their adjacent ends and heads at their opposite ends, a ram extending through the cylinders with its ends protruding from the heads at the opposite ends, said sole plate being secured to the end of the ram protruding from the head end of the first cylinder, a switch adjacent the end of the ram protruding from the head end of the second cylinder, and means for controlling the movement of the sole plate comprising a first sleeve concentric with the ram, said first sleeve having one end in the first cylinder and extending therefrom through the second cylinder and through its head end, a first collar fixed to the ram, said first collar being recessed through the head end of the first cylinder and movable therein, a second collar fixed to the end of the ram extending from the head end of the second cylinder, said first sleeve having an axial length less than the distance between said collars, a second sleeve concentric with and surrounding the first sleeve, said second sleeve having one end in said second cylinder and extending therefrom through its head end, threads on the portion of the second sleeve extending from the head end of the second cylinder, a positioning nut threaded onto said threaded portion of said second sleeve, an annular shoulder on the portion of the first sleeve within the second cylinder concentric with the second sleeve and engageable with the one end of the second sleeve in said second cylinder, first and second pistons in the cylinders fixed, respectively, to the first and second sleeves, means for suppying pressure to both sides of the first piston and means for supplying pressure to the side of the second piston adjacent its head end, said first piston being operable by supplying pressure to the side adjacent the head end to move the first sleeve into engagement with the second shoulder and hence the ram in a direction away from the bottom of the lasted upper to position the sole plate at a predetermined distance therefrom, said movement of the first sleeve disengaging the opposite end thereof from the first collar so that at said position the ram is movable relative to the sleeve in a direction away from the bottom of the lasted upper, and means for adjusting the position of the switch at said opposite end of the ram so that it will be actuated by movement of the ram away from the bottom of the lasted upper to terminate injection.

2. Apparatus according to claim 1, wherein the first piston is operable by pressure supplied to the side adjacent the intermediate head to move the sleeve into engagement with the first shoulder and hence the ram in a direction to move the sole plate into engagement with the bottom of the lasted upper.

3. Apparatus according to claim 1, wherein said second piston is operable by pressure supplied to the side adjacent the head end of its cylinder to resist movement of the sole plate away from the bottom of the lasted upper.

4. Apparatus according to claim 1, wherein the cylinders are of corresponding diameter.

5. Apparatus according to claim 1, wherein the adjustable nut is adjustable axially on the ram and operable by engagement with the head end of the second cylinder to determine said predetermined distance of the sole plate from the bottom of the lasted upper.

6. Apparatus according to claim 1, wherein the side ring contains a groove subjacent its upper edge corresponding in thickness to the edge strip to be formed and in depth to the thickness of the bottom to be formed.

References Cited

UNITED STATES PATENTS

| | | | |
|---|---|---|---|
| 3,018,517 | 1/1962 | Ludwig | 18—17 |
| 3,056,165 | 10/1962 | Berrill et al. | 18—17 |
| 3,267,520 | 8/1966 | Ludwig | 18—17 |
| 3,284,558 | 11/1966 | Ludwig. | |

WILBUR L. McBAY, *Primary Examiner.*

U.S. Cl. X.R.

18—17